(12) United States Patent
Bleacher et al.

(10) Patent No.: US 9,628,840 B2
(45) Date of Patent: *Apr. 18, 2017

(54) PORTABLE VEHICLE ENTERTAINMENT SYSTEMS WITH WIRELESS COMMUNICATION OF ENTERTAINMENT CONTENT

(71) Applicant: Thales Avionics, Inc., Irvine, CA (US)

(72) Inventors: Brett Bleacher, Rancho Santa Margarita, CA (US); Andrew Philip Musgrave, Surrey (GB); David Thomas, Chichester (GB); Simon Isaac Gresham, Huntington Beach, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,234

(22) Filed: Jan. 5, 2016

(65) Prior Publication Data

US 2016/0134920 A1 May 12, 2016

Related U.S. Application Data

(63) Continuation of application No. 14/087,254, filed on Nov. 22, 2013, now Pat. No. 9,247,279.

(51) Int. Cl.
*H04N 21/414* (2011.01)
*H04N 21/422* (2011.01)
*H04N 21/443* (2011.01)
*H04N 21/214* (2011.01)
(Continued)

(52) U.S. Cl.
CPC ... *H04N 21/41422* (2013.01); *H04N 21/2146* (2013.01); *H04N 21/26258* (2013.01); *H04N 21/41407* (2013.01); *H04N 21/422* (2013.01); *H04N 21/4436* (2013.01); *H04N 21/6405* (2013.01)

(58) Field of Classification Search
USPC .................... 361/600, 679.01–837, 724–727
See application file for complete search history.

(56) References Cited

U.S. PATENT DOCUMENTS

| 8,170,535 | B1 | 5/2012 | Lopes et al. |
| 9,143,738 | B2* | 9/2015 | Keen ................. H04B 7/18506 |
| 2013/0157687 | A1 | 6/2013 | Mori |

(Continued)

*Primary Examiner* — Omar S Parra
(74) *Attorney, Agent, or Firm* — Sage Patent Group

(57) ABSTRACT

A portable entertainment system for a vehicle includes a portable housing, a transceiver, a processor, a memory, and a rechargeable battery. The transceiver communicates through RF signals with Portable Electronic Devices (PEDs) operated by vehicle passengers. The rechargeable battery supplies power to the transceiver, the processor, and the memory. The memory is coupled to the processor and includes entertainment content and further includes computer readable program code that causes the processor to communicate a list, of at least some of the entertainment content available in the memory, to the PEDs. A content selection message is received through the transceiver from one of the PEDs that requests communication of a selected one of the entertainment content identified in the list. The selected entertainment content is communicated through the transceiver to the PED. The transceiver, the processor, and the memory are enclosed within the portable housing.

33 Claims, 9 Drawing Sheets

(51) Int. Cl.
*H04N 21/262* (2011.01)
*H04N 21/6405* (2011.01)

(56) References Cited

U.S. PATENT DOCUMENTS

2014/0013365 A1 1/2014 Ezaki et al.
2014/0208370 A1 7/2014 Hatakeyama et al.

* cited by examiner

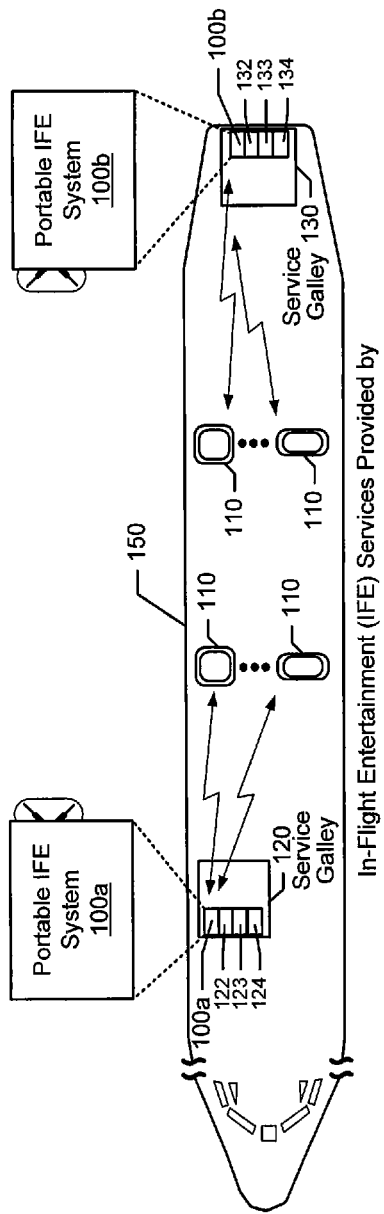
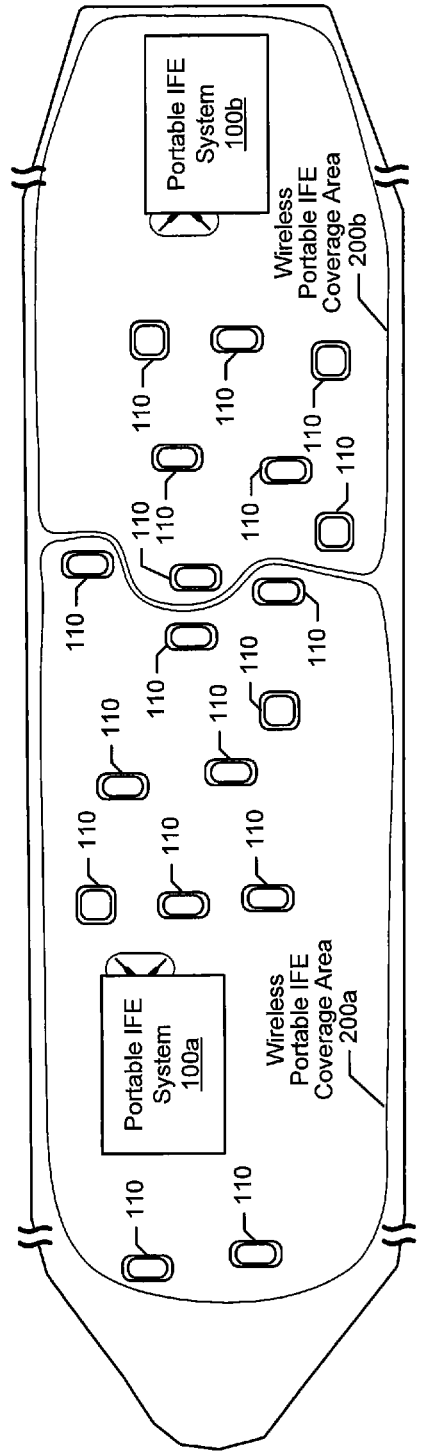

PORTABLE VEHICLE ENTERTAINMENT SYSTEMS WITH WIRELESS COMMUNICATION OF ENTERTAINMENT CONTENT

RELATED APPLICATIONS

The present patent application is a continuation patent application claiming benefit of priority from U.S. patent application Ser. No. 14/087,254, filed Nov. 22, 2013, the disclosure of which is hereby incorporated herein in its entirety by reference.

TECHNICAL FIELD

The present disclosure relates to vehicle entertainment systems.

BACKGROUND

In-flight entertainment (IFE) systems are typically tailored to the needs of aircraft that carry more than 150 passengers. Such aircraft have spacious interiors as well as generous weight carrying and power supply capabilities that can support IFE systems having in-seat mounted video displays, seat electronics boxes mounted under rows of seats for processing content for the video displays, and large closets in which to store head-end equipment that distributes content to the seat electronics boxes. Potential drawbacks of such an IFE system can include the expense of equipment installation (seat modification effort and aircraft downtime for installation), increased aircraft weight (with associated increased fuel consumption), equipment cost, and electrical power consumption. These drawbacks can make IFE systems impractical and expensive for use in the aircraft of regional jet carriers. One approach to partially compensate for these drawbacks is to install in-seat video displays in only a portion of the aircraft. This is often done on a service class basis (first class only, for example). Another approach is to reduce the level of personalization in IFE systems, such as by having individual passengers share monitors with many other passengers. However, this approach can degrade the in-flight experiences for those passengers.

Some IFE systems have been proposed which provide battery-powered hand-out media players. Such media players are typically DVD players, where passengers obtain the DVDs from a library carried onboard the aircraft. The library of DVDs has to be maintained by the flight crew, who is also responsible for recharging and maintaining the media players.

SUMMARY

Some embodiments of the present invention are directed to a portable entertainment system for a vehicle. The portable entertainment system includes a portable housing, a transceiver, at least one processor, at least one memory, and a rechargeable battery. The transceiver communicates through radio frequency (RF) signals with Portable Electronic Devices (PEDs) operated by vehicle passengers. The rechargeable battery supplies power to the transceiver, the at least one processor, and the at least one memory. The at least one memory is coupled to the at least one processor and includes entertainment content and further includes computer readable program code that when executed by the at least one processor causes the at least one processor to perform operations that include communicating a list of media content and/or streaming of at least some of the entertainment content available in the at least one memory, to the PEDs. A content selection message is received through the transceiver from one of the PEDs that requests communication of a selected one of the entertainment content identified in the list. The selected one of the entertainment content is communicated through the transceiver to the one of the PEDs. The transceiver, the at least one processor, and the at least one memory are enclosed within the portable housing.

In some further embodiments, the portable housing may be a catering canister configured to be stored on a catering rack of a service galley of the vehicle. The catering canister can include a metal layer that encloses the transceiver, the at least one processor, and the at least one memory to shield RF emissions therefrom. An antenna can be mounted to a front exterior surface of the catering canister, and be configured to transmit and receive RF signals between the transceiver and the PEDs operated by vehicle passengers.

In some further embodiments, a level of service, provided to at least some of the PEDs for communication of electronic content, is controlled responsive to the remaining power of the rechargeable battery. The bandwidth provided through the transceiver for communication to at least some of the PEDs may be controlled to be reduced responsive to the remaining power of the rechargeable battery no longer satisfying a defined threshold. Streaming of video content may be ceased while continuing to allow downloading of application programs from the at least one memory for execution on the at least some of the PEDs responsive to the remaining power of the rechargeable battery no longer satisfying a defined threshold, so as to conserve remaining power of the rechargeable battery.

In some further embodiments, a pressure altimeter is connected to the at least one processor and causes the at least one processor to selectively turn off the transceiver responsive to a signal from the pressure altimeter indicating that a present flight phase is one in which entertainment services are prohibited from being provided to passengers.

In some further embodiments, two or more of the portable entertainment systems can be spaced apart on the vehicle to create two partially overlapping service areas in which entertainment services are provided to the PED. One of the portable entertainment systems can determine which of the PEDs are located within the overlapping service area of the transceivers of the first and second portable housings, and can communicate an assignment message to the transceiver of the other portable entertainment system requesting that it provide entertainment services to defined ones of the PEDs located within the overlapping service area.

In some further embodiments, the portable entertainment systems can exchange lists of their available entertainment content and can download entertainment content from one to another so as to distribute content across the portable entertainment systems.

Other portable entertainment systems and methods according to embodiments of the invention will be or become apparent to one with skill in the art upon review of the following drawings and detailed description. It is intended that all such additional portable entertainment systems and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 1 illustrates two portable entertainment systems for an aircraft that provide In-Flight Entertainment (IFE) services to PEDs operated by passengers of the aircraft, according to some embodiments of the present invention;

FIG. 2 illustrates PEDs that have been assigned to different wireless coverage areas of the two portable IFE systems of FIG. 1;

DETAILED DESCRIPTION

Figure 3:
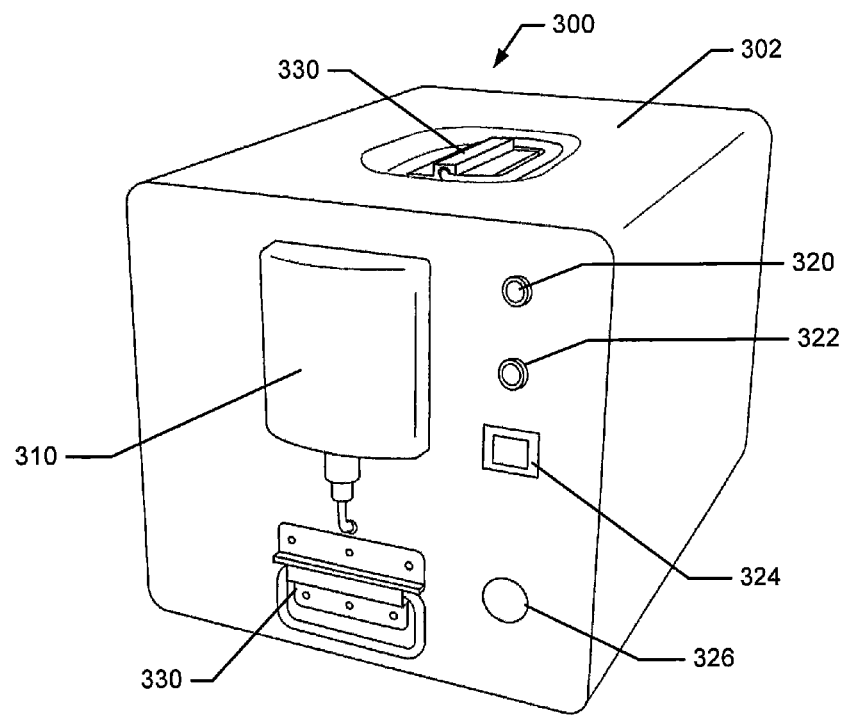
FIG. 3 is an external view of a catering canister housing that encloses electronic components of a portable IFE system of FIGS. 1 and 2, according to some embodiments.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of portable entertainment systems for a vehicle are disclosed. Although various embodiments are explained herein in the context an In-Flight Entertainment (IFE) environment for aircraft, other embodiments of portable entertainment systems are not limited thereto and may be used in other types of vehicles, including ships, buses, trains, and automobiles.

FIG. 1 illustrates two portable entertainment systems (portable IFE systems 100*a* and 100*b*) residing within the fuselage of an aircraft 150 and providing IFE services to PEDs 110 operated by passengers of the aircraft, according to some embodiments. Each of the portable IFE systems 100*a* and 100*b* can be carried on the aircraft 150 and configured as a catering canister to allow storage on a catering rack of a service galley 120 of the aircraft 150. For example, the portable IFE system 100*a* can be secured on a rack within a forward service galley 120, adjacent on the rack to various types of catering canisters 122-124 (e.g., containing drinks, food, serving trays, utensils, etc.). Another portable IFE system 100*b* can be secured on a rack within a rear service galley 130 (e.g., rear area of aircraft cabin); adjacent on the rack to various types of catering canisters 132-134 (which may be similar to canisters 122-124).

The portable IFE systems 100*a* and 100*b* (individually referred to as "portable IFE system 100" or "system 100" for brevity) provide entertainment services to the PEDs 110 that are operated by passengers of the aircraft 150. The PED 110 may include, but are not limited to, tablet computers, laptop computers, palmtop computers, cellular smart phones, etc.

The portable IFE systems 100*a* and 100*b* contain entertainment content within memory that can be communicated through wireless communication interfaces to the PEDs 110. The entertainment content may include, but is not limited to, movies, television shows, music, electronic magazines, electronic books, electronic newspapers, application programs (e.g., games, etc.) that can be provided as streaming content to the PEDs 110 and/or as downloadable files for execution on the PEDs 110. The portable IFE systems 100*a* and 100*b* may, for example, communicate video streams, audio streams, and/or gaming streams (e.g., acting as a game console feeding video and audio to multiplayer remote displays the receiving player commands therefrom).

The portable IFE system 100 (e.g., 100*a* or 100*b*) includes a portable housing, a transceiver configured to communication through radio frequency (RF) signals with the PEDs 110 operated by vehicle passengers, at least one processor, at least one memory, at least one display, and a rechargeable battery that supplies power to the transceiver, the at least one processor, the at least one memory, and at least one display. The at least one memory is coupled to the at least one processor and includes entertainment content and further includes computer readable program code that when executed by the at least one processor causes the at least one processor to perform operations described herein as being performed by a portable entertainment system, including, but not limited to, one or both of the portable IFE systems 100*a* and/or 100*b* of FIG. 1. The transceiver, the at least one processor, and the at least one memory are enclosed within a portable housing.

Figure 8:
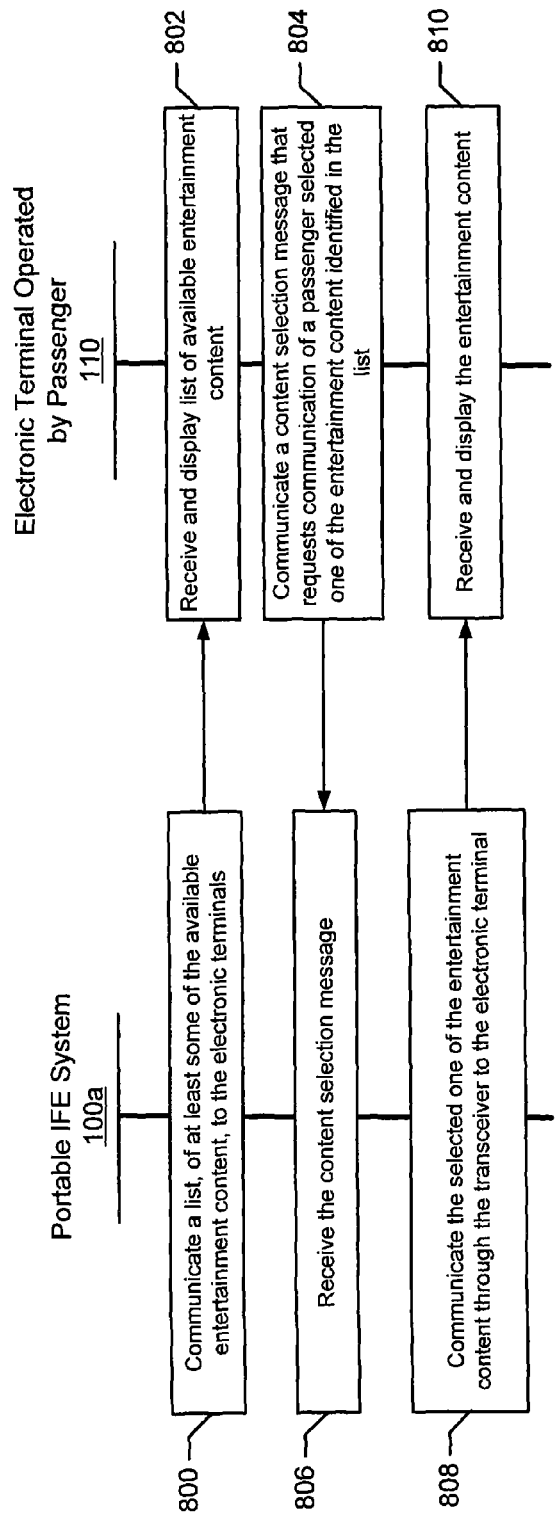
FIG. 8 illustrates a combined data flow diagram and flowchart of operations and methods by which a portable IFE system provides entertainment services to an PED.

FIG. 8 illustrates a combined data flow diagram and flowchart of operations and methods by which the portable IFE system 100 provides entertainment services to a PED. The processor of the portable IFE system 100*a* communicates (block 800) a list, of at least some of the entertainment content available in the at least one memory, to the PED 110. One of the PEDs 110 receives and displays (block 802) the list of available entertainment content for viewing and selection among by a passenger. A passenger may, for example, scroll through picture previews, video previews, and/or textual descriptions of the available electronic content. Responsive to a passenger selecting to receive one of the available electronic content (e.g., by touch selecting a user selection indicia displayed for the selected content), the PED 110 communicates (block 804) a content selection message requesting communication of the selected one of the available electronic content which was identified in the list. The portable IFE system 100*a* receives (block 806) the content selection message and, responds thereto, by communicating (block 808) the selected one of the entertainment content through the transceiver to the PED 110. The PED 110 receives and displays (block 810) the entertainment content on a display device.

Portable IFE System Configured Within a Catering Canister

FIG. 3 is an external view of an example catering canister 300 that forms a portable IFE system 100. The catering canister 300 includes a housing 302 having a metal layer that encloses electronic components of the portable IFE system of FIGS. 1 and 2, according to some embodiments. The metal layer encloses the transceiver, the at least one processor, and the at least one memory to shield RF emissions therefrom. Shielding RF emissions from such components in this manner may be particularly advantageous for aircraft environments where electromagnetic interference (EMI) from an IFE system can interfere with operation of aircraft avionics systems and thereby raise serious safety concerns.

An antenna 310 is connected to the transceiver and configured to transmit and receive RF signals between the transceiver and the PEDs 110. The antenna 310 is mounted to an exterior surface of the housing 302. The antenna 310 may be preferably mounted to a front exterior surface of the housing 302 facing away from a rack while the catering canister 300 is stored on the rack, which may reduce shielding by the rack and adjacent canisters (e.g., 122-124 or 132-134) of the RF signals transmitted from the antenna 310 to the PEDs 110 and the RF signals to be received by the antenna 310 from the PEDs 110.

The catering canister 300 can include front, side, and/or top secured handles 330 to facilitate lifting and transportation by service personnel between the storage rack on the aircraft 150 and a storage facility. The catering canister 300 may include a visual indication 320 (e.g., blinking lights, multicolored lights, LCD/other display) of functional modes and/or operational status of the enclosed electronic components, and/or may include a switch 322 (e.g., power switch, operational mode switch, etc.). A power plug 324 can be provided in the housing 302 and connectable to an external power source to charge of the rechargeable battery from power received from a power source outside the canister 300 (e.g., public power utility). A USB, Ethernet or Fiberoptic port 326 or other network port can be provided in the catering canister 300 to allow uploading of entertainment content to memory of the portable IFE system 100 and/or downloading of entertainment content from the memory for distribution to other portable IFE systems 100 located within the aircraft 150 and/or a storage facility.

Figure 4:
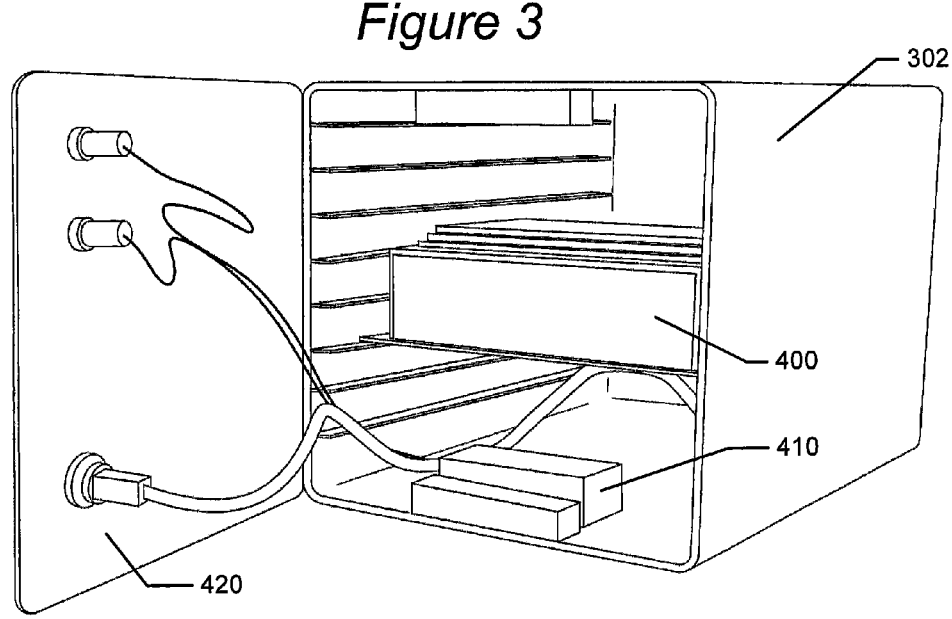
FIG. 4 illustrates electronic components inside the housing of the catering canister that provide entertainment services to the PEDs, according to some embodiments.

FIG. 4 illustrates electronic components inside the housing 302 of the catering canister 300 that provide entertainment services to the PEDs 110, according to some embodiments. A front access door/panel 420 has been opened to expose a computer system 400 that, in one embodiment, includes the transceiver, the at least one processor, and the at least one memory.

The computer system 400 may be a commercial off-the-shelf computer system that executes computer readable program code is configured to provide the operations and methods disclosed herein. A rechargeable battery 410 supplies power to the transceiver, the at least one processor and the at least one memory of the computer system 400. The housing 302 including the front access door/panel 420 can be configured to have sufficient strength, temperature tolerance, and environmental sealing to inhibit external escape of gasses from inside in case of burning of the rechargeable battery. Configuring the housing 302 in this manner may be particularly advantageous for aircraft environments where gasses from fire cannot be easily vented and may result in serious injury to passengers and disruption of flight plans.

Figure 5:
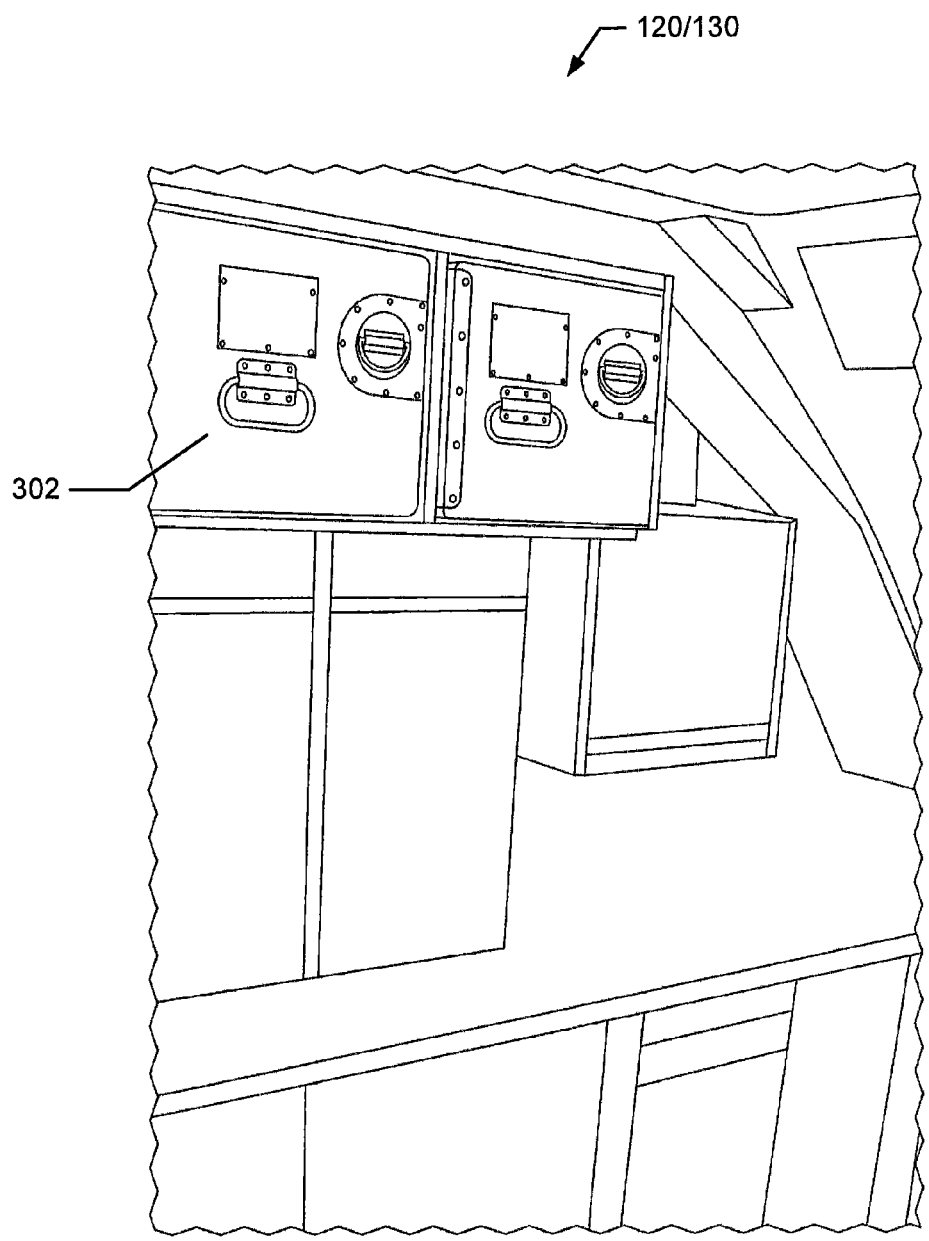
FIG. 5 illustrates the catering canister of FIGS. 3 and 4 stored on a rack within a service galley of the aircraft, according to some embodiments.

FIG. 5 illustrates the catering canister 300 of FIGS. 3 and 4 stored on a rack within a service galley (e.g. service galley 120 or service galley 130) of the aircraft 150, according to some embodiments.

Using GPS Functionality in Portable IFE System

A global positioning system (GPS) antenna may be mounted to an exterior surface of the housing 302. The GPS antenna may be enclosed within the same housing of the antenna 310. A GPS unit, within the housing 302, can be connected to receive GPS signals from the GPS antenna and configured to determine a location of the portable IFE system 100 while it is being transported from a storage facility to the aircraft 150.

The metal fuselage of the aircraft 150 is likely to sufficiently shield GPS signals from being receivable by the GPS antenna while the catering canister 300 is within the aircraft 150. However, the GPS unit can be configured to capture and store in a memory of the GPS unit information obtained from GPS signals received by the GPS antenna while the portable IFE system 100 is being transported from a storage facility to the vehicle, and to process the information from the memory of the GPS unit to determine a location of the portable IFE system 100 while the portable IFE system 100 is stored on the rack of the service galley (e.g., service galley 120/130) with the GPS antenna shielded from receiving further GPS signals by the fuselage of the aircraft 150. Accordingly, during brief times while the GPS antenna is being carried with a non-shielded RF line of sight to GPS satellites, the GPS unit can rapidly record a snapshot of information from the GPS signals in the memory for later use for GPS code searching within the captured GPS signal information in the memory according to known GPS signal acquisition processes.

The portable IFE system 100 may use the determined geographic location to select a default language for textual information and/or audible speech relating to the entertainment content in the list that is communicated to the PEDs 110. For example, when the determined location is within a country having a primary/official language (e.g., English, French, German, Arabic, etc.), the portable IFE system 100 can select that primary/official language as the default language for communication of textual information and/or audible speech relating to the available entertainment content in the list. Similarly, when the determined location in within a country having a plurality of predominately used languages, the portable IFE system 100 can provide textual information and/or audible speech relating to the available entertainment content in the list using the plurality of predominately used languages.

Assignment of PEDs to Portable IFE Systems

FIG. 2 illustrates how the PEDs 110 have been assigned to different wireless coverage areas of the two portable IFE systems 100a and 100b of FIG. 1. The portable IFE systems 100a and 100b are spaced apart on the aircraft 150 to create two partially overlapping service areas in which entertainment services are provided to the PEDs 110. At least one processor within at least one of portable IFE systems 100a and 100b performs operations to determining which of the PEDs 110 are located within the overlapping service area of the transceivers of the portable IFE systems 100a and 100b, and communicates an assignment message to the transceiver of the other one of the portable IFE systems 100a and 100b requesting that the at least one processor of the other one of the portable IFE systems 100a and 100b provide entertainment services to defined ones of the PEDs 110 located within the overlapping service area.

Thus, for example, the portable IFE system 100a can control the other portable IFE system 100b to provide entertainment services to PEDs 110 within the wireless portable IFE coverage area 200b. The portable IFE system 100a can similarly choose to provide entertainment services to PEDs 110 within the wireless portable IFE coverage area 200a. As illustrated in FIG. 2, PEDs 110 that are near boundaries of the coverage areas 200a and 200b can be selectively assigned to be serviced by one or the other of the portable IFE systems 100a and 100b.

Figure 9:
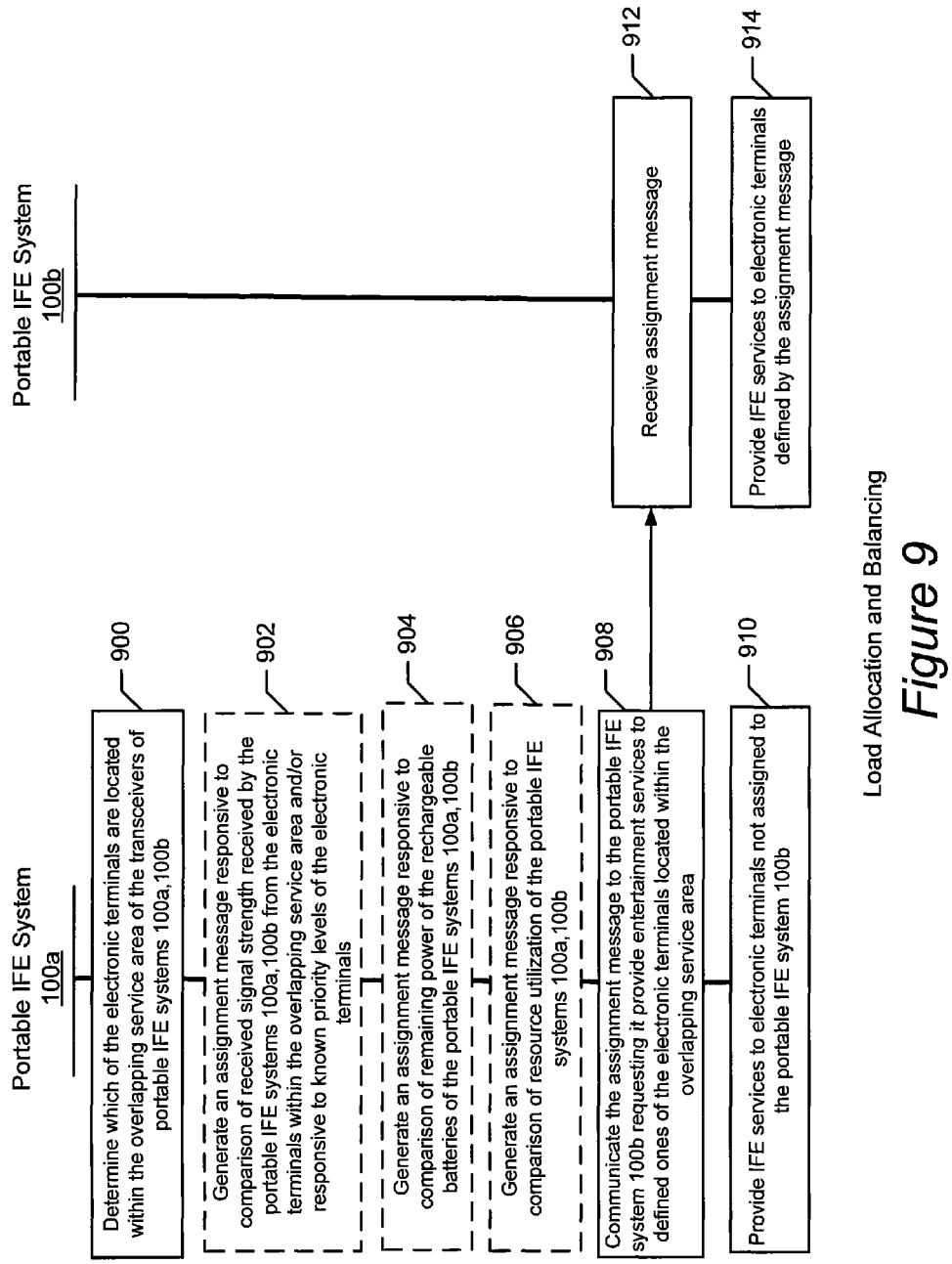
FIG. 9 illustrates a combined data flow diagram and flowchart of operations and methods by which an portable IFE system performs initial-assignment/reassignment of PEDs to itself and another portable IFE system.

Referring to FIG. 9, various operations and methods are illustrated through which a portable IFE system 100 can perform initial-assignment/reassignment of PEDs 110 to itself and another portable IFE system within the aircraft 150. The portable IFE system 100a (e.g., one or more processors thereof) can determine (block 900) which of the PEDs 110 are located within the overlapping service area of the transceivers of the portable IFE system 100a and 100b, which may include the portable IFE system 100a receiving a list from the portable IFE system 100b containing identifiers for PEDs 110 that have attempted to register, log-in, and/or otherwise request entertainment services from the other portable IFE system 100b. The portable IFE system 100a can compare the list of identifiers for PEDs 110 to a list it generated of identifiers for PEDs 110 that have attempted to register, log-in, and/or otherwise request entertainment services from the portable IFE system 100a. PEDs 110 that are common to both lists can be selectively assigned to the portable IFE system 100a or the other portable IFE system 100b for receiving entertainment services therefrom.

The portable IFE system 100a may generate (block 902) an assignment message responsive to comparison of RF signal strength received from identified ones of the PEDs 110 as measured by the transceiver(s) of one or both of the portable IFE systems 100a and 100b.

Alternatively or additionally, the portable IFE system 100a may generate (block 904) an assignment message responsive to comparison of remaining power of the rechargeable batteries 410 of the portable IFE systems 100aand 100b.

Alternatively or additionally, the portable IFE system 100a may generate (block 904) an assignment message to reassign at least one of the PEDs 110 that has been provided entertainment services from the at least one processor of the portable IFE system 100a to be subsequently provided entertainment services from the at least one processor of the other portable IFE system 100b responsive to the remaining power of the rechargeable battery 410 of the portable IFE system 100a no longer satisfying a defined threshold while the remaining power of the rechargeable battery 410 of the other portable IFE system 100b continues to satisfy a defined threshold.

Alternatively or additionally, the portable IFE system 100a may generate (block 906) an assignment message to reassign at least one of the PEDs 110 that has been provided entertainment services from the at least one processor of the portable IFE system 100a to be subsequently provided entertainment services from the at least one processor of the other portable IFE system 100b responsive to comparison of resource utilization of the portable IFE systems 100a and 100b. For example, when the portable IFE system 100a has less than a threshold level of available communication bandwidth, available processor throughput, available memory, etc., the portable IFE system 100a can generate an assignment message to the other portable IFE system 100b to handoff identified ones of the PEDs 110 so that those PEDs 110 are subsequently provided entertainment services from the other portable IFE system 100b.

Alternatively or additionally, the portable IFE system 100a may identify a set of the PEDs 110 located within the overlapping service area that have requested a same streaming video file of the entertainment content available in the at least one memory of both of the portable IFE systems 100a and 100b, and generate (also illustrated by block 906) the assignment message to cause the at least one processor of the other portable IFE system 100b to communicate the same streaming video file of the entertainment content from the at least one memory of the other portable IFE system 100b as a multicast stream to the set of the PEDs.

The portable IFE system 100a communicates (block 908) the assignment message to the transceiver of the other portable IFE system 100b requesting that the at least one processor of the other portable IFE system 100b provide entertainment services to defined ones of the PEDs 110 located within the overlapping service area. The other portable IFE system 100b receives (block 912) the assignment message, and responsively provides (block 914) entertainment services to the PEDs 110 defined by the assignment message. The portable IFE system 100b provides (block 910) entertainment services to the PEDs 110 that were not assigned to the other portable IFE system 100b.

In some other embodiments, some of the PEDs 110 may be provided entertainment services by both of the portable IFE systems 100a and 100b. Providing entertainment services from both of the portable IFE systems 100a and 100b may advantageously lower the resource utilization impact on both systems 100a and 100b and/or may provide a higher quality of service through the combined communications from both systems 100a and 100b. The decision to provide entertainment services from more than one of the systems 100a and 100b may be based on a priority level associated with individual ones of the PEDs 110 (e.g., PEDs operated by passengers in a premium class, by passengers having a premium flight member status, and/or passengers who are members of the crew).

Battery Power Consumption Management

Because the portable IFE systems 100a and 100b are powered by a rechargeable battery while temporarily mounted in the aircraft 150, it is important to manage power consumption by the portable IFE systems 100a and 100b to provide a greatest possible quality of service to the PEDs 110 according to one or more defined rules. FIGS. 10-14 illustrate flowcharts of operations and methods performed by the at least one processor executing computer readable program code in the at least one memory to manage entertainment services provided to the PEDs 110 responsive to remaining power of the rechargeable battery of the portable IFE system 100.

Figure 10:
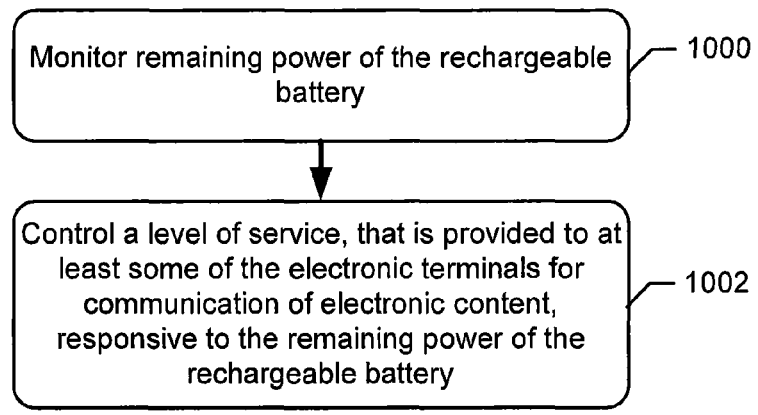
FIGS. 10-14 illustrate flowcharts of operations and methods for managing entertainment services provided to PEDs responsive to remaining power of a rechargeable battery of the portable IFE system.

Referring to the flowchart of FIG. 10, the portable IFE system 100 monitors (block 1000) remaining power of the rechargeable battery. The system 100 controls (block 1002) a level of service, that is provided to at least some of the PEDs 110 for communication of electronic content, responsive to the remaining power of the rechargeable battery.

Figure 11:
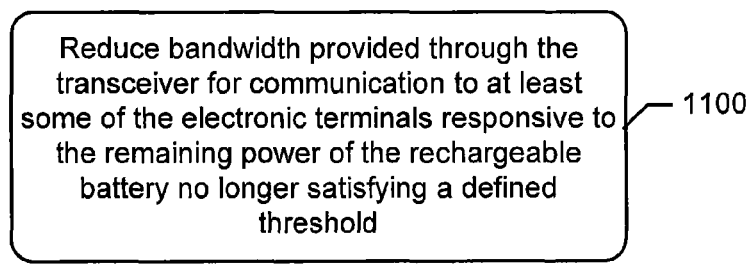

Referring to the flowchart of FIG. 11; in one embodiment, the system 100 reduces the level of service provided to at least some of the PEDs 110 responsive to the remaining power of the rechargeable battery no longer satisfying a defined threshold, by reducing (block 1100) bandwidth provided through the transceiver for communication to at least some of the PEDs 110 responsive to the remaining power of the rechargeable battery no longer satisfying a defined threshold.

Figure 12:
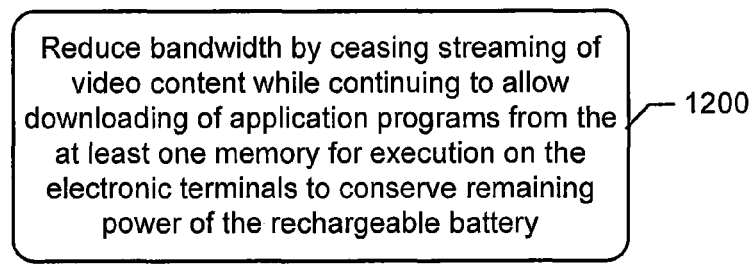

Referring to the flowchart of FIG. 12, in another embodiment, the system 100 reduces the level of service provided to at least some of the PEDs 110 responsive to the remaining power of the rechargeable battery no longer satisfying a defined threshold, by ceasing (block 1200) streaming of video content while continuing to allow downloading of application programs from the at least one memory for execution on the at least some of the PEDs 110 to conserve remaining power of the rechargeable battery.

Figure 13:
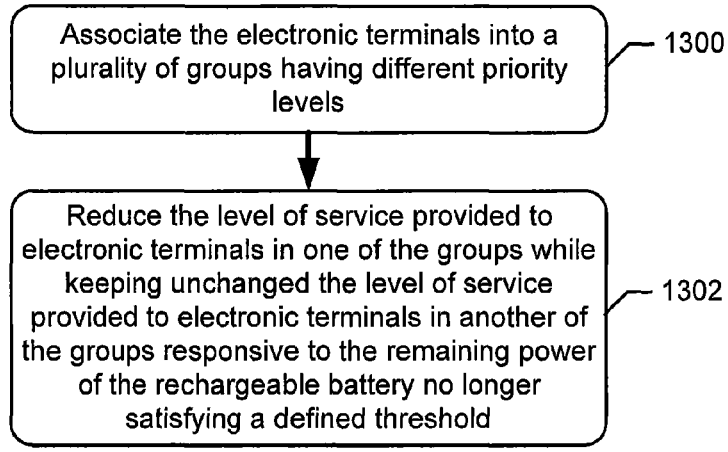

Referring to the flowchart of FIG. 13, in another embodiment, the system 100 associates (block 1300) the PEDs 110 into a plurality of groups having different priority levels, and reduces (block 1302) the level of service provided to PEDs 110 in one of the groups while keeping unchanged the level of service provided to PEDs 110 in another of the groups responsive to the remaining power of the rechargeable battery no longer satisfying a defined threshold.

The portable IFE system 100 can include a pressure altimeter connected to the at least one processor. The computer readable program code causes the at least one processor to perform operations that include selectively turning off the transceiver responsive to a signal from the pressure altimeter.

Figure 14:
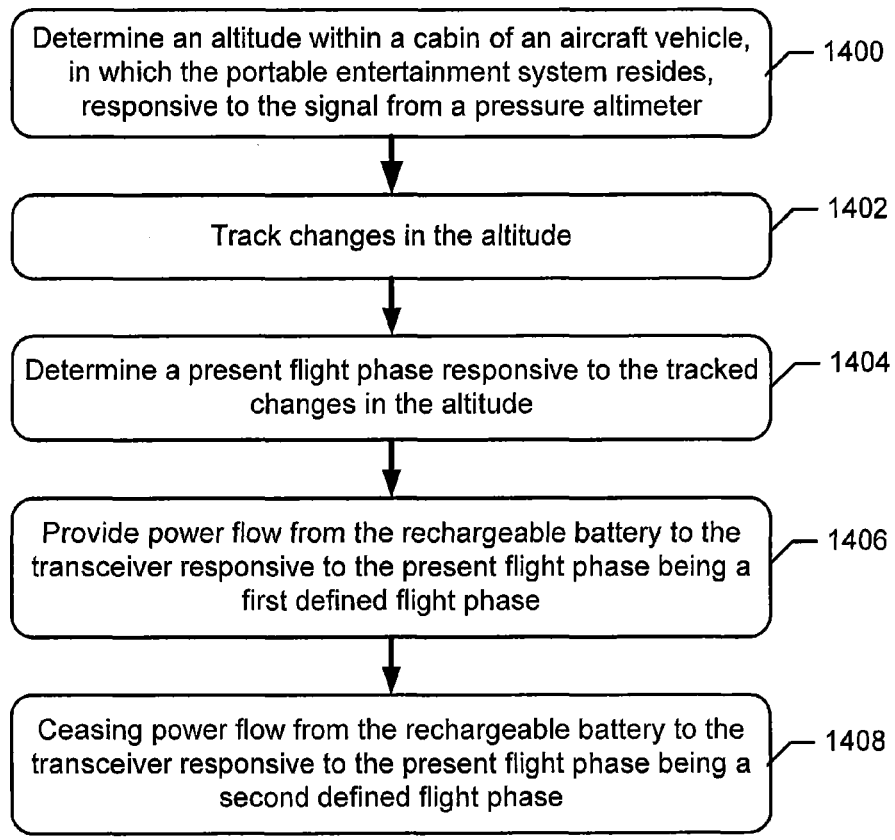

Referring to the flowchart of FIG. 14, the system 100 can determine (block 1400) an altitude within a cabin of the aircraft 150, in which the system 100 resides, responsive to the signal from the pressure altimeter. The system 100 can track (block 1402) changes in the altitude, and determine (block 1404) a present flight phase responsive to the tracked changes in the altitude. The system 100 can provide (block 1406) power flow from the rechargeable battery to the transceiver responsive to the present flight phase being a first defined flight phase, and can cease (block 1408), e.g., switch-off, power flow from the rechargeable battery to the transceiver responsive to the present flight phase being a second defined flight phase. In this manner, the system 100 can automatically turned off/maintain of the transceiver while the aircraft is in a takeoff flight phase, landing flight phase, and/or operating in another aircraft flight phase in which wireless communications by the system 100 is prohibited/undesired to, for example, prevent interference with flight critical avionics systems.

In a further embodiment, the system 100 can determine when the aircraft 150 has landed responsive to the tracked changes in the altitude. The system 100 can respond to the determination that the aircraft has landed by powering on the transceiver and constraining the PEDs 110 to accessing a reduced subset of the list of at least some of the entertainment content available in the at least one memory while the aircraft 150 remains on the ground after landing and before beginning a takeoff flight phase. Thus, after the aircraft has landed, the system 100 may provide limited services to passengers to, for example, check connecting flight status, gate assignments, safety video announcements/demonstrations and/or luggage conveyor assignments.

The system 100 may additionally include an accelerometer connected to the at least one processor, and computer readable program code the causes the at least one processor to perform operations that include determining the present flight phase responsive to the tracked changes in the altitude and a signal from the accelerometer. Using accelerometer data in conjunction with altimeter data and/or instead of using accelerometer data may improve the accuracy at which the system 100 determines the present flight phase of the aircraft and, thereby, more accurately control turning on/off the transceiver, timing for initiating/ceasing provision of entertainment services to the PEDs 110, and/or constraining what entertainment services are being provided to the PEDs 110.

Example Block Diagram of Portable IFE System

Figure 6:
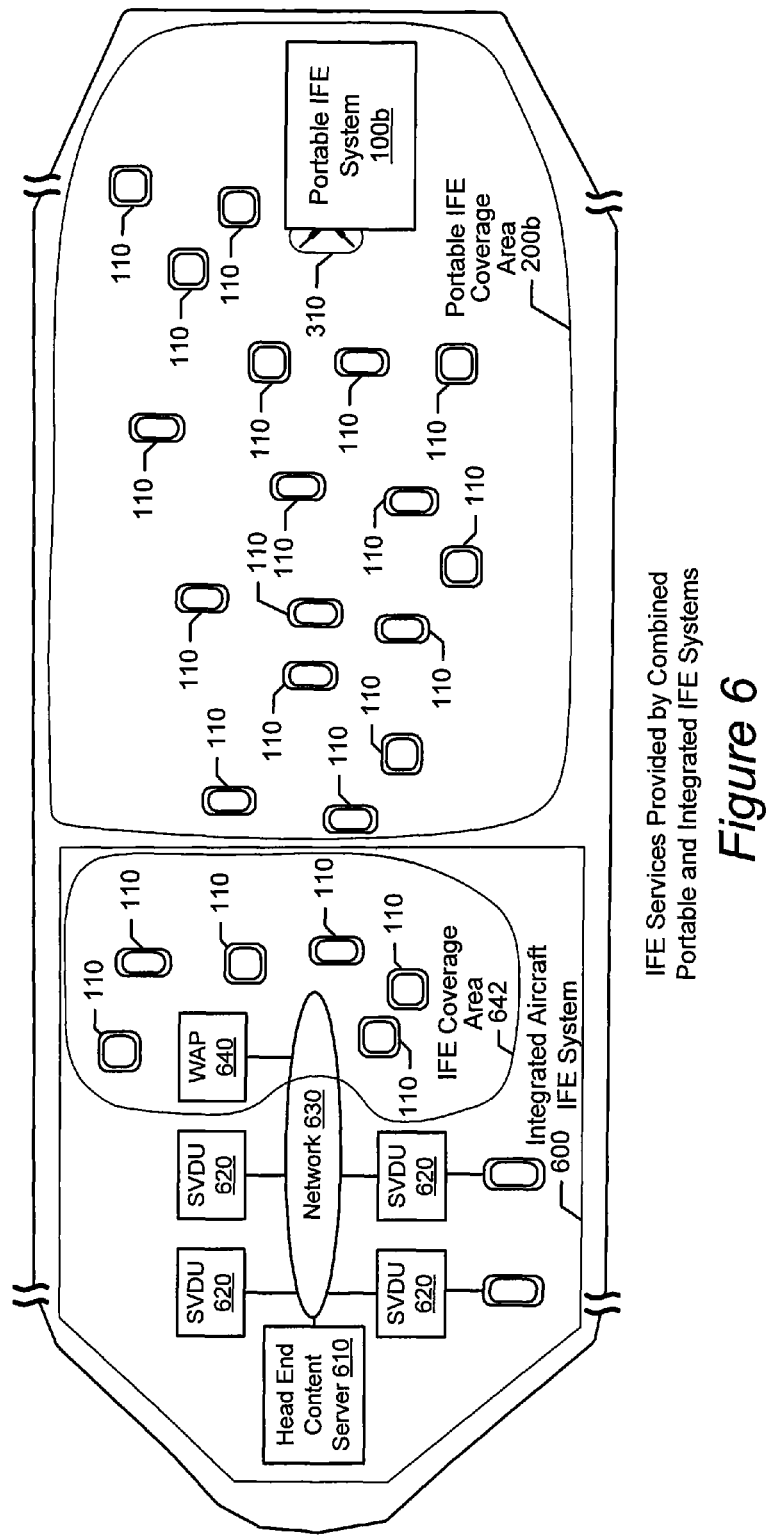
FIG. 6 illustrates PEDs that have been assigned to different wireless coverage areas of an integrated aircraft IFE system and a portable IFE system.
Figure 7:
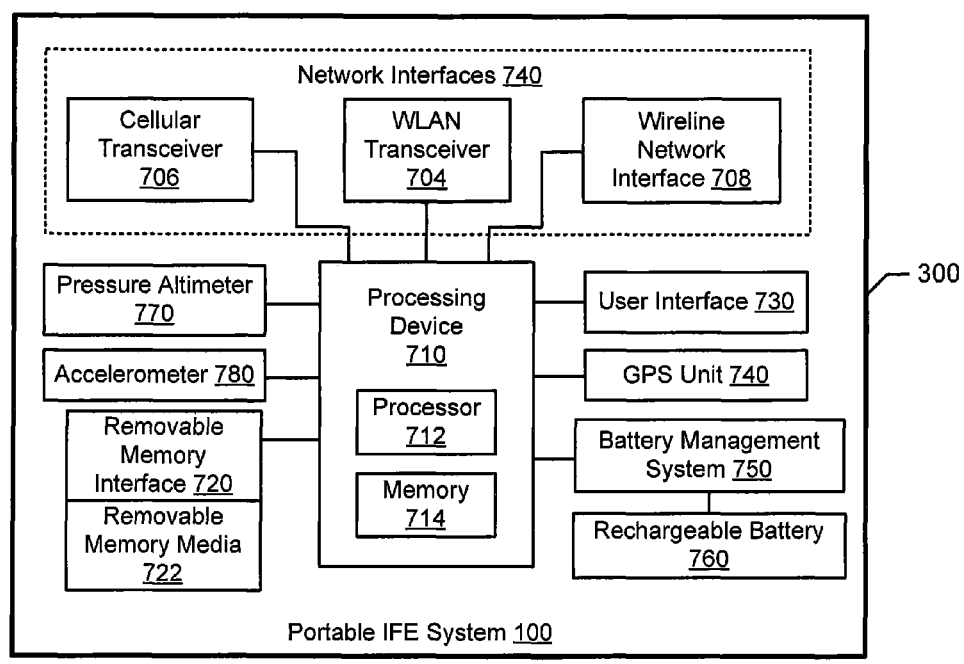
FIG. 7 illustrates a block diagram of a portable IFE system according to some embodiments.

FIG. 7 is a functional circuit block diagram of a portable IFE system 100 configured according to some embodiments of the present invention, and elements of which may be included in the portable IFE systems of FIGS. 1-6 and 8-14. The portable IFE system 100 includes a network interface 740 having at least one RF transceiver 704/706, a processing device 710 having at least one processor 712 and at least one memory 714, a pressure altimeter 770, and a rechargeable battery 760 that supplies power to the network interface 740, the processing device 710, the pressure altimeter 770 and other electronic components of the portable IFE system 100. The rechargeable battery 760 may be a lithium-ion technology battery or another type of technology battery.

The battery management system 750 can control battery operations and parameters to prevent/avoid damage to battery cells during discharge and charge, including, but not limited to, over-voltage, over-current, over-temperature, trickle charge versus quick charge, etc.

The network interface 740 may include a cellular transceiver 706, a wireless local area network (WLAN) transceiver 704, and/or another RF transceiver 706, and may further include a wireline network interface (e.g., Ethernet, etc.) 708. The network interface 740 can be configured to communicate with the PEDs 110 of FIGS. 1-6 and 8-14. The cellular transceiver 706 may operate according to one or more cellular radio access technologies that may include, but are not limited to, GSM, GPRS, EDGE, DCS, PDC, PCS, CDMA, wideband-CDMA, CDMA2000, UMTS, and/or 3GPP LTE. The network interface may further include a SATCOM transceiver and Ground to Air transceiver for communication with satellite during flight and/or another transceiver configured to communicate with ground stations during flight.

The processor 712 may include one or more data processing circuits, such as a general purpose and/or special purpose processor (e.g., microprocessor and/or digital signal processor) that may be collocated or distributed across one or more networks. The processor 712 is configured to execute computer readable program code in the memory 714, described below as a computer readable medium, to perform some or all of the operations and methods that are described above for one or more of the embodiments, such as the embodiments of FIGS. 1-6 and 8-14.

The portable IFE system 100 further include an accelerometer 780, user interface 730 (e.g. lights and/or display panel that indicates functional modes and/or operational status of the electronic components, keyboard, keypad, buttons, power switch, operational mode switch(es)), a GPS unit 740, and/or a removable memory interface 720 (e.g. USB interface, memory card interface, etc.) that interfaces to a removable memory media 722 (e.g., solid state memory device).

The various battery management functionality operations and methods described herein may be performed directly by the processing device 710 and/or by a separate battery management system 750. When performed by a separate battery management system 750, the processing device 710 may be powered off during times when the network interface 740 is powered off in order to further reduce power consumption from the rechargeable battery 760 during times when entertainment services are not being provided to the PEDs 110.

The electronic components illustrated in FIG. 7 can be enclosed within the housing 300 which, as described above, can be configured as a catering canister that is storable on a catering rack of a service galley.

Coordinated Operations Between a Portable IFE System and an Integrated IFE System Referring to FIG. 6, the portable IFE system 100b may be used in combination with an integrated IFE system 600. The integrated IFE system 600 can include a head end content server 610 that provides entertainment services through a data network (e.g., Ethernet) 630 to seat video display units (SVDUs) 620 that each mounted within a seat back facing a corresponding passenger seated in a following row of seats. The heading content server 610 includes entertainment content, such as movies, television shows, music, electronic magazines, electronic books, electronic newspapers, application programs (e.g., games, etc.) that can be provided as streaming content to the SVDUs 620 and/or as downloadable files for execution on the SVDUs 620. The integrated IFE system 600 may additionally or alternatively provide entertainment services to wireless PEDs 110 within coverage area 642 through a wireless access point (WAP) 640, such as a WLAN router and/or a cellular-based network (e.g. a pico cell).

The portable IFE system 100*b* may be transported onto the aircraft 150 to provide entertainment services to a portion of the aircraft (i.e., within portable IFE coverage area 200*b*) that may partially overlap the IFE coverage area 642 of the integrated aircraft IFE system 600. The portable IFE system 100*b* and the integrated aircraft IFE system 600 may communicate in the manner explained above for FIG. 9 to determine assignment of PEDs that are located within overlapping service areas of the systems 100*b* and 600 to one of the systems 100*b* and 600 for receiving entertainment services therefrom. The communications may occur through a wireless network and/or a wired network.

Accordingly, in an aircraft or other vehicle that has an existing integrated IFE system, passengers who are seated outside the coverage area of the integrated IFE system and/or are not entitled to receive services from the integrated IFE system (e.g., coach class passengers not having permission to receive entertainment services from an integrated IFE system) can be provided services for a segment of a flight or other travel by transporting a portable IFE system onto the aircraft/vehicle within communication range of those passengers. The portable IFE system may additionally or alternatively be used to provide enhanced entertainment services to passengers who are capable of receiving service from an existing integrated IFE system, by providing a different collection of entertainment content that can be provided to PEDs of those passengers, increased communication bandwidth for providing entertainment content to PEDs of those passengers, etc.

Content Distribution Between Portable IFE Systems

Some other embodiments are directed to distributing entertainment content from one portable entertainment system to another portable entertainment system. The at least one processor of a first one of the portable entertainment systems can obtain from the transceiver of a second one of the portable entertainment systems a list of at least some of the entertainment content available in the at least one memory of the second portable entertainment system. The at least one processor of the first portable entertainment system can compare content of the list obtained from the transceiver of the second portable entertainment system to the list of at least some of the entertainment content available in the at least one memory of the first portable entertainment system, and can communicate entertainment content that is determined to be absent in the at least one memory of the second portable entertainment system and which is present in the at least one memory of the first portable entertainment system responsive to the comparing.

While the portable entertainment systems reside in a storage facility plugged into power sockets to charge their rechargeable batteries, they can communicate with one another to compare and distribute entertainment content. More particularly, while the first portable entertainment system is plugged into an external power source, it can operate to compare and distribute entertainment content to other portable entertainment systems and can cease distributing content responsive to it ceasing to be plugged into an external power source (so as to avoid draining life from the rechargeable battery).

In one embodiment, the at least one processor of the first portable entertainment system may initiate the obtaining from the transceiver of the second portable entertainment system the list of at least some of the entertainment content available in the at least one memory of the second portable entertainment system, responsive to an event that occurs while the transceiver, the at least one processor and the at least one memory of the first portable entertainment system are supplied power from a power source that is not the rechargeable battery and is outside the first portable housing. The at least one processor of the first portable entertainment system may cease communicating entertainment content that is determined to be absent in the at least one memory of the second portable entertainment system and which is present in the at least one memory of the first portable entertainment system, responsive to the transceiver, the at least one processor and the at least one memory of the first portable entertainment system ceasing to be supplied power from the power source that is outside the first portable housing.

Further Definitions and Embodiments:

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluEray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed:

1. A portable in-flight entertainment system for an aircraft, comprising:
    a portable housing comprising a crew portable canister transportable onto the aircraft;
    a transceiver configured to communicate through radio frequency (RF) signals with Portable Electronic Devices (PEDs) operated by passengers;
    at least one processor;
    at least one memory, wherein the at least one memory is coupled to the at least one processor and comprises entertainment content and further comprises computer readable program code executed by the at least one processor to perform operations comprising:
        communicating a list, of at least some of the entertainment content available in the at least one memory, to the PEDs;
        receiving a content selection message through the transceiver from one of the PEDs that requests communication of a selected one of the entertainment content identified in the list; and
        communicating the selected one of the entertainment content through the transceiver to the one of the PEDs; and
    wherein the transceiver, the at least one processor, and the at least one memory are enclosed within the portable housing.

2. The portable in-flight entertainment system of claim 1, wherein the crew portable canister is configured to be stored on a catering rack of a service galley of the aircraft.

3. The portable in-flight entertainment system of claim 1,
    wherein the crew portable canister comprises a metal layer that encloses the transceiver, the at least one processor, and the at least one memory, the metal layer of the crew portable canister at least partially shielding RF emissions from the transceiver and the at least one processor; and
    the portable entertainment system further comprises an antenna configured to transmit and receive RE signals between the transceiver and the PEDs operated by passengers, wherein the antenna is mounted to an exterior surface of the crew portable canister.

4. The portable in-flight entertainment system of claim 3, wherein:
the crew portable canister is configured to be stored on a catering rack of a service galley of the aircraft; and
the antenna, is mounted to a front exterior surface of the crew portable canister facing away from the catering rack while the crew portable canister is stored on the catering rack.

5. The portable in-flight entertainment system of claim 3, further comprising a rechargeable battery that supplies power to the transceiver, the at least one processor and the at least one memory,
wherein the crew portable canister has an access door that is configured to inhibit external escape of gasses from inside the crew portable canister in case of burning of the rechargeable battery.

6. The portable in-flight entertainment system of claim 1, further comprising a rechargeable battery that supplies power to the transceiver, the at least one processor and the at least one memory,
wherein the operations further comprise:
monitoring remaining power of the rechargeable battery; and
controlling a level of service, that is provided to at least some of the PEDs for communication of the electronic content, responsive to the remaining power of the rechargeable battery.

7. The portable in-flight entertainment system of claim 6, wherein the controlling a level of service, that is provided to at least some of the PEDs for communication of the electronic content, responsive to the remaining power of the rechargeable battery, comprises:
reducing bandwidth provided through the transceiver for communicating entertainment content from the at least one memory to at least some of the PEDs responsive to the remaining power of the rechargeable battery no longer satisfying a defined threshold.

8. The portable in-flight entertainment system of claim 6, wherein the controlling a level of service, that is provided to at least some of the PEDs for communication of the electronic content, responsive to the remaining power of the rechargeable battery, comprises:
reducing the level of service provided to at least some of the PEDs responsive to the remaining power of the rechargeable battery no longer satisfying a defined threshold, by ceasing streaming of video content while continuing to allow downloading of application programs from the at least one memory for execution on the at least some of the PEDs to conserve remaining power of the rechargeable battery.

9. The portable in-flight entertainment system of claim 6, wherein the controlling a level of service, that is provided to at least some of the PEDs for communication of the electronic content, responsive to the remaining power of the rechargeable battery, comprises:
associating the PEDs into a plurality of groups having different priority levels; and
reducing the level of service provided to PEDs in one of the groups while keeping unchanged the level of service provided to PEDs in another of the groups responsive to the remaining power of the rechargeable battery no longer satisfying a defined threshold.

10. The portable in-flight entertainment system of claim 1, further comprising a pressure altimeter connected to the at least one processor;
wherein the operations further comprise:
selectively turning off the transceiver responsive to a signal from the pressure altimeter.

11. The portable in-flight entertainment system of claim 10, wherein the selectively turning off the transceiver responsive to a signal from the pressure altimeter, comprises:
determining an altitude within a cabin of the aircraft in which the portable entertainment system resides, responsive to the signal from the pressure altimeter;
tracking changes in the altitude;
determining a present flight phase responsive to the tracked changes in the altitude;
providing power to the transceiver responsive to the present flight phase being a first defined flight phase; and
ceasing providing power to the transceiver responsive to the present flight phase being a second defined flight phase that is different than the first flight phase.

12. A portable in-flight entertainment system for an aircraft, comprising:
a portable housing;
a transceiver configured to communicate through radio frequency (RE) signals with Portable Electronic Devices (PEDs) operated by aircraft passengers;
at least one processor;
at least one memory; and
a rechargeable battery that supplies power to the transceiver, the at least one processor and the at least one memory,
wherein the at least one memory is coupled to the at least one processor and comprises entertainment content and further comprises computer readable program code executed by the at least one processor to perform operations comprising:
communicating to the PEDs a list of at least some of the entertainment content available in the at least one memory;
receiving a content selection message through the transceiver from one of the PEDs that requests communication of a selected one of the entertainment content identified in the list;
communicating the selected one of the entertainment content through the transceiver to the one of the PEDs;
monitoring remaining power of the rechargeable battery; and
controlling a level of service, that is provided to at least some of the PEDs for communication of the electronic content, responsive to the remaining power of the rechargeable battery, and
wherein the transceiver, the at least one processor and the at least one memory are enclosed within the portable housing.

13. The portable in-flight entertainment system of claim 12, wherein the controlling a level of service, that is provided to at least some of the PEDs for communication of the electronic content, responsive to the remaining power of the rechargeable battery, comprises:
reducing bandwidth provided through the transceiver for communicating entertainment content from the at least one memory to at least some of the PEDs responsive to the remaining power of the rechargeable battery no longer satisfying a defined threshold.

14. The portable in-flight entertainment system of claim 12, wherein the controlling a level of service, that is provided to at least some of the PEDs for communication of the electronic content, responsive to the remaining power of the rechargeable battery, comprises:
reducing the level of service provided to at least some of the PEDs responsive to the remaining power of the rechargeable battery no longer satisfying a defined threshold, by ceasing streaming of video content while continuing to allow downloading of application programs from the at least one memory for execution on the at least some of the PEDs to conserve remaining power of the rechargeable battery.

15. The portable in-flight entertainment system of claim 12, wherein the controlling a level of service, that is provided to at least some of the PEDs for communication of the electronic content, responsive to the remaining power of the rechargeable battery, comprises:
associating the PEDs into a plurality of groups having different priority levels; and
reducing the level of service provided to PEDs in one of the groups while keeping unchanged the level of service provided to PEDs in another of the groups responsive to the remaining power of the rechargeable battery no longer satistying a defined threshold.

16. The portable in-flight entertainment system of claim 12,
further comprising a pressure altimeter connected to the at least one processor;
wherein the computer readable program code causes the at least one processor to perform operations comprising:
selectively turning off the transceiver responsive to a signal from the pressure altimeter.

17. The portable in-flight entertainment system of claim 16, wherein the computer readable program code causes the at least one processor to perform operations comprising:
determining an altitude within a cabin of the aircraft, in which the portable in-flight entertainment system resides, responsive to the signal from the pressure altimeter;
tracking changes in the altitude;
determining a present flight phase responsive to the tracked changes in the altitude;
providing power flow from the rechargeable battery to the transceiver responsive to the present flight phase being a first defined flight phase; and
ceasing power flow from the rechargeable battery to the transceiver responsive to the present flight phase being a second defined flight phase that is different than the first flight phase.

18. The portable in-flight entertainment system of claim 17, wherein the computer readable program code causes the at least one processor to perform operations comprising:
determining when the aircraft has landed responsive to the tracked changes in the altitude;
responding to the determination that the aircraft has landed by powering on the transceiver and constraining the PEDs to accessing a reduced subset of the list of at least some of the entertainment content available in the at least one memory while the aircraft remains on the ground after landing and before beginning a takeoff flight phase.

19. The portable in-flight entertainment system of claim 17,
further comprising an accelerometer connected to the at least one processor;
wherein the computer readable program code causes the at least one processor to perform operations comprising:
determining the present flight phase responsive to the tracked changes in the altitude and a signal from the accelerometer.

20. The portable in-flight entertainment system of claim 12,
further comprising first and second ones of the portable housing, each comprising the transceiver, the at least one processor, and the at least one memory;
wherein the first and second portable housings are spaced apart on the aircraft to create two partially overlapping service areas in which entertainment services are provided to the PEDs; and
wherein the computer readable program code in the at least one memory of the first portable housing causes the at least one processor within the first portable housing to perform operations comprising:
determining which of the PEDs are located within the overlapping service area of the transceivers of the first and second portable housings; and
communicating an assignment message to the transceiver of the second portable housing requesting that the at least one processor of the second portable housing provide entertainment services to defined ones of the PEDs located within the overlapping service area.

21. The portable in-flight entertainment system of claim 20, wherein the computer readable program code in the at least one memory of the first portable housing causes the at least one processor within the first portable housing to perform operations comprising:
generating the assignment message responsive to comparison of received signal strength of RF signals received by the transceivers of the first and second portable housings from the PEDs located within the overlapping service area and/or responsive to known priority levels of the PEDs located within the overlapping service area.

22. The portable in-flight entertainment system of claim 20, wherein the computer readable program code in the at least one memory of the first portable housing causes the at least one processor within the first portable housing to perform operations comprising:
generating the assignment message responsive to comparison of remaining power of the rechargeable batteries of the first and second portable housings.

23. The portable in-flight entertainment system of claim 22, wherein the generating the assignment message responsive to comparison of remaining power of the rechargeable batteries of the first and second portable housings, comprises:
generating the assignment message to reassign at least one of the PEDs that has been provided entertainment services from the at least one processor of the first portable housing to be subsequently provided entertainment services from the at least one processor of the second portable housing responsive to the remaining power of the rechargeable battery of the first portable housing no longer satisfying a defined threshold while the remaining power of the rechargeable battery of the second portable housing continues to satisfy a defined threshold.

24. The portable in-flight entertainment system of claim 20, wherein the computer readable program code in the at least one memory of the first portable housing causes the at least one processor within the first portable housing to perform operations comprising:

identifying a set of the PEDs located within the overlapping service area that have requested a same streaming video file of the entertainment content available in the at least one memory of both of the first and second portable housings; and generating the assignment message to cause the at least one processor of the second portable housing to communicate the same streaming video file of the entertainment content from the at least one memory of the second portable housing as a multicast stream to the set of the PEDs.

25. The portable in-flight entertainment system of claim 12, further comprising first and second ones of the portable housing, each comprising the transceiver, the at least one processor, and the at least one memory;

wherein the computer readable program code in the at least one memory of the first portable housing causes the at least one processor within the first portable housing to perform operations comprising:

obtaining from the transceiver of the second portable housing a list of at least some of the entertainment content available in the at least one memory of the second portable housing;

comparing content of the list obtained from the transceiver of the second portable housing to a list of at least some of the entertainment content available in the at least one memory of the first portable housing; and communicating entertainment content that is determined to be absent in the at least one memory of the second portable housing and which is present in the at least one memory of the first portable housing responsive to the comparing.

26. The portable in-flight entertainment system of claim 1, further comprising first and second ones of the portable housing, each comprising the transceiver, the at least one processor, and the at least one memory;

wherein the first and second portable housings are spaced apart on the aircraft to create two partially overlapping service areas in which entertainment services are provided to the PEDs; and wherein the computer readable program code in the at least one memory of the first portable housing causes the at least one processor within the first portable housing to perform operations comprising:

communicating an assignment message to the transceiver of the second portable housing requesting that the at least one processor of the second portable housing provide entertainment services to at least one of the PEDs located within the overlapping service area.

27. The portable in-flight entertainment system of claim 26, wherein the computer readable program code in the at least one memory of the first portable housing causes the at least one processor within the first portable housing to further perform operations comprising:

generating the assignment message responsive to a known priority level of the at least one of the PEDs located within the overlapping service area.

28. The portable in-flight entertainment system of claim 26, wherein:

each of the first and second portable housings comprises a rechargeable battery enclosed within the portable housing that supplies power to the transceiver, the at least one processor, and the at least one memory enclosed within the portable housing; and the computer readable program code in the at least one memory of the first portable housing causes the at least one processor within the first portable housing to further perform operations comprising generating the assignment message responsive to comparison of remaining power of the rechargeable batteries of the first and second portable housings.

29. The portable in-flight entertainment system of claim 28, wherein:

the generating the assignment message responsive to comparison of remaining power of the rechargeable batteries of the first and second portable housings, comprises generating the assignment message to reassign at least one of the PEDs located within the overlapping service area that has been provided entertainment services from the at least one processor of the first portable housing to be subsequently provided entertainment services from the at least one processor of the second portable housing responsive to the remaining power of the rechargeable battery of the first portable housing no longer satisfying a defined threshold while the remaining power of the rechargeable battery of the second portable housing continues to satisfy a defined threshold.

30. The portable in-flight entertainment system of claim 26, wherein the computer readable program code in the at least one memory of the first portable housing causes the at least one processor within the first portable housing to perform operations comprising:

identifying a set of the PEDs located within the overlapping service area that have requested a same streaming video file of the entertainment content available in the at least one memory of both of the first and second portable housings; and generating the assignment message to cause the at least one processor of the second portable housing to communicate the same streaming video file of the entertainment content from the at least one memory of the second portable housing as a multicast stream to the set of the PEDs.

31. The portable in-flight entertainment system of claim 1, further comprising first and second ones of the portable housing, each comprising the transceiver, the at least one processor, and the at least one memory;

wherein the computer readable program code in the at least one memory of the first portable housing causes the at least one processor within the first portable housing to perform operations comprising:

obtaining from the second portable housing a list of at least some of the entertainment content available in the at least one memory of the second portable housing;

comparing content of the list obtained from the second portable housing to a list of at least some of the entertainment content available in the at least one memory of the first portable housing; and communicating, through the transceiver of the first portable housing toward the second portable housing, an entertainment content that is determined to be absent in the at least one memory of the second portable housing and which is present in the at least one memory of the first portable housing responsive to the comparing.

32. The portable in-flight entertainment system of claim 1, further comprising first and second ones of the portable housing, each comprising the transceiver, the at least one processor, and the at least one memory;
- wherein the computer readable program code in the at least one memory of the first portable housing causes the at least one processor within the first portable housing to perform operations comprising:
  - obtaining from the second portable housing a list of at least some of the entertainment content available in the at least one memory of the second portable housing;
  - comparing content of the list obtained from the second portable housing to a list of at least some of the entertainment content available in the at least one memory of the first portable housing; and
  - requesting, through the transceiver of the first portable housing from the second portable housing, an entertainment content that is determined to be absent in the at least one memory of the first portable housing and which is present in the at least one memory of the second portable housing responsive to the comparing.

33. The portable in-flight entertainment system of claim 12, wherein the controlling a level of service, that is provided to at least some of the PEDs for communication of the electronic content, responsive to the remaining power of the rechargeable battery, comprises:
- ceasing streaming of video content provided to at least some of the PEDs responsive to the remaining power of the rechargeable battery no longer satisfying a defined threshold.

* * * * *